July 5, 1966   E. J. HERBENAR   3,259,408
BALL JOINT
Filed May 3, 1961

INVENTOR.
Edward J. Herbenar
BY
ATTORNEYS

United States Patent Office 3,259,408
Patented July 5, 1966

3,259,408
BALL JOINT
Edward J. Herbenar, Detroit, Mich., assignor to
TRW Inc., a corporation of Ohio
Filed May 3, 1961, Ser. No. 107,409
5 Claims. (Cl. 287—87)

This invention relates to a ball joint and more particularly to a ball joint having a bearing with upper and lower bearing portions such as to eliminate the unseating problem which exists in other types of ball joint designs.

In accordance with the invention, a stud having a spherical ball end is mounted for rotatable and tiltable movement in a socket by means of a bearing having upper and lower bearing portions each of which maintains bearing contact above and below the center line of the ball of the stud, thereby transferring reaction load to a straight cylindrical socket wall of the socket. This eliminates any vertical reaction or unseating loads which might otherwise result from loads applied parallel to the socket stem. Thus the design overcomes the unseating problem that has existed with many otherwise advantageous socket designs.

The ball joint of the invention is a greased for life joint intended primarily for use as an automobile steering linkage tie rod socket, although it is applicable to any linkage or rod end requiring motion in more than one plane. A bottom closure or plug is provided against which a spring or coil or wave washer type bears at one end, and at the other end the spring bears against the lower bearing portion. A dust and grease seal of sliding or deflection type design is mounted on a dome or retaining portion of the socket to provide the greased for life construction referred to.

Accordingly, it is an object of the present invention to provide a ball joint which eliminates the unseating problem which has existed with most other socket designs.

Another object of the invention is to provide a ball joint as described which is adapted to afford wear takeup as required.

Another object of the invention is to provide a greased for life socket.

Another object of the invention is to provide a ball joint as described wherein the bearing portions are readily assembled for maintaining an initially tight socket-to-bearing contact.

Yet another object of the invention is to provide a ball joint as described having spring means to afford an initial preload for the socket establishing turning torque at a desired value, with the spring maintaining this torque value by taking up any wear occurring between the ball head and bearing portions.

Other objects and advantages of the invention will become apparent as the description proceeds in accordance with the drawings in which.

Figure 1:
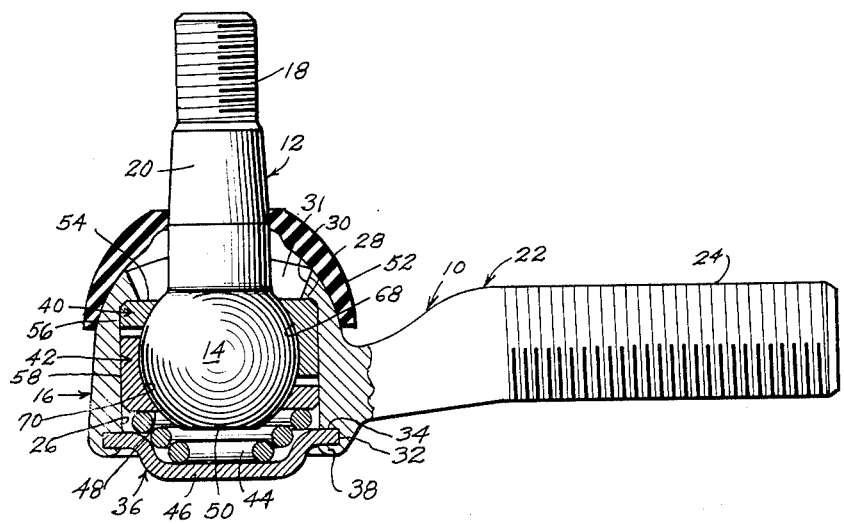
FIGURE 1 is a view substantially in vertical section of a ball joint according to the present invention.

Referring now to the drawings, and to FIGURE 1 in particular, a ball joint 10 is shown according to one embodiment of the present invention which includes a stud 12 having a spherical ball end 14 to oscillate in a socket 16 in any plane, the other end of the stud having a threaded or other construction 18 for making a rigid connection to another link, rod or the like. A tapered shank portion 20 is afforded for fitting into a complementary wheel bracket or the like as understood by those skilled in the art, although a press fit shank, threaded shank or other suitable construction may be utilized also in accordance with the understanding of the skilled worker in the art.

The socket 16 in turn has a stem 22 with a threaded or other connecting structure 24 for rigid engagement in a steering linkage, it being understood that although the ball joint of the invention is intended primarily for use as an automobile steering linkage tie rod socket, it is applicable to any linkage or rod end requiring motion in more than one plane.

Further in accordance with the invention, the socket 16 has a cylindrical inner wall 26 with an abutment or shoulder 28 at the upper end thereof which is beveled upwardly and outwardly at 30 and thus forms an opening 31 suitable for rotatably and tiltably receiving the stem of the stud 12.

A counterbore is provided at the lower end of the socket as indicated at 32, with a shoulder 34 against which a bottom wall or plug 36 is seated by means of a spun-over portion 38 of the socket.

It is a major objective of the invention to eliminate the unseating characteristic of previously available socket designs, and to this end a bearing is provided having an upper bearing half 40 and a lower bearing half 42, as hereinafter further described. A spring 44 of either of the coil type or the wave washer type is mounted in a locally deformed and outwardly convex portion 46 of the wall 36, and is preferably of inverted frusto-conical configuration to bear at its upper end against the bottom surface 48 of the lower bearing half 42. The ball head 14 may have a segmentally flat portion 50 at its lower end to further afford space within the socket if desired.

The socket 16 may have an upper dome construction on which a dust and grease seal 52 is mounted which is of a sliding or deflection type design and sealed against the shank of the stud 12 to retain grease within the socket and to afford a greased for life socket construction after the grease has been supplied initially.

Figure 2:
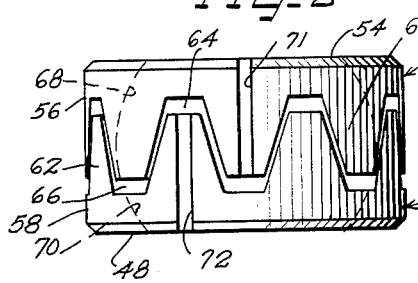
FIGURE 2 is an enlarged side elevational view of a bearing for the ball joint of FIGURE 1.

Referring again to FIGURE 1, and also to FIGURE 2, the bearing halves or portions 40 and 42 are preferably of substantially identical construction, the upper bearing half having a top wall 54 for seating against the shoulder 28. However, in accordance with the invention, each of the bearing halves provides bearing contact both above and below the center line of the ball head as taken perpendicularly to the axis of the socket chamber, thereby to transfer reaction loads to the straight cylindrical socket wall 26. Thus the bearing halves 40 and 42 have cylindrical outer walls 56 and 58 complementary to the socket wall 26, as hereinafter further described. The individual bearing halves in the embodiment shown in FIGURES 1 and 2 are each formed with a plurality of frusto-conical teeth 60 and 62 respectively extending circumferentially therearound and defining complementary frusto-conical spaces 64 and 66 therebetween. Thus the teeth 60 of the upper bearing half 40 are adapted to be received within the complementary space 66 of the lower bearing half 42, and conversely, the teeth 62 of the lower bearing half 42 are adapted to fit snugly within the spaces 64 of the upper bearing half 40, although a spacing is maintained between the respective bearing halves and the respective teeth thereof in their assembled condition. Thus the bearing halves each define interior segmentally spherical surfaces 68 and 70 respectively each having a curvature substantially corresponding to that of the ball head 14. Thereby, the teeth 60 and 62 on the respective bearing halves afford the described bearing contact for each of the bearing halves which is maintained both above and below the center line of the ball 14. The segmentally spherical interior surfaces 68 and 70 also are dimensioned so as to cooperate with the ball head 14 to define the proximately spaced relationship between the upper and lower bearing halves and their respective teeth. Because of the bearing contact at portions above and below the center line of the ball for each of the bearing halves and since the bearing halves cannot expand significantly, the vertical reaction or unseating force from any load applied parallel to the socket stem is minimized and the unseating problem which exists in other socket designs is eliminated.

A variety of materials may be utilized for the respective bearing halves 40 and 42 of the embodiment of FIGURES 1 and 2, as well as for the embodiments hereinafter described. Such materials may include steel, bronze or plastic, materials such as nylon, Delrin (an acetyl resin manufactured by Du Pont), Lexan (a polycarbonate manufactured by General Electric), or a phenolic cloth laminate or the like, for example.

The bearing portions or halves may be designed with a line to line interference on the diameter with reference to the socket bore, which in a preferred embodiment is a .006 inch interference. In this construction, the bearing to ball contact occurs initially only at the edges of the spherical diameter, with a gap then occurring at the ball equator such that it is eliminated when the bearing is assembled.

Further, each of the bearing portions has a split which may be taken substantially radially such as the splits 71 and 72 which preferably may be a .060 inch split, thereby permitting easy assembly of the bearings into the socket 16 while maintaining an initially tight socket-to-bearing contact.

The spring 44 provides an initial preload to the bearings 42 and 40 respectively, with the bearing 42 being urged against the ball head 14 and the ball head 14 correspondingly being urged against the bearing half 40 so that the bearing half 40 is urged against the shoulder 28. Likewise, the spring maintains a loading of the bearing halves relative to the socket wall 26, and the initial preload for the socket as a whole establishes a turning torque of a desired value. The spring 44 maintains this torque value by taking up any wear occurring between the ball and the bearing halves 40 and 42.

Figure 3:
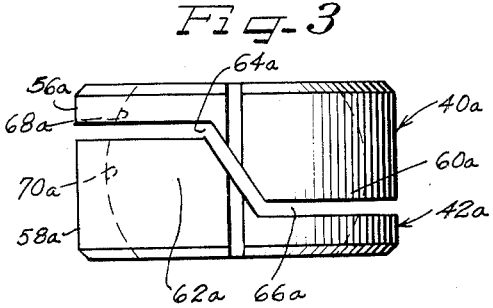
FIGURE 3 is a side elevational view of a second embodiment of a bearing according to the invention.

Other forms of the invention wherein the bearing halves maintain a contact above and below the center line of the ball stud are also encompassed within the scope of the invention and the illustrated embodiments are to be considered exemplary only. Referring to FIGURE 3, a second embodiment is shown wherein similar parts are designated by similar reference numerals, but the bearing halves 40a and 42a are formed with but one element which may be termed a tooth structure, rather than with a plurality of teeth as in the preceding embodiment. Thus the tooth 60a extends for substantially one half of the circumference of the upper bearing half 40a while the lower bearing half 42a has a complementary upstanding tooth or elevated member 62a which is complementary to the space 64a defined by the upper bearing half 40a and its projection 60a. Correspondingly, the space 66a on the lower bearing half is complementary to the projection or tooth 60a and thus it will be seen that each of the respective projections 60a and 62a maintains a contact for the interior segmental spherical surfaces 68a and 70a which extends above and below the center line of the ball, thereby transferring the reaction load to the straight cylindrical socket wall 26. The exterior surfaces 56a and 58a of the bearing halves are complementary to the socket wall 26 and are configured and dimensioned as described with respect to the preceding embodiment.

Figure 4:
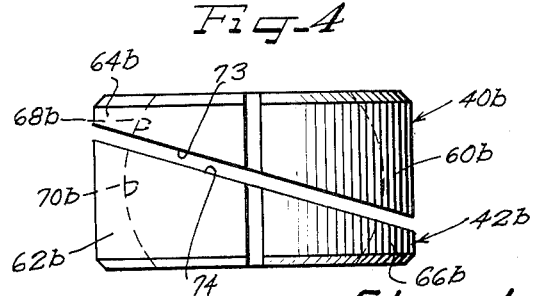
FIGURE 4 is a side elevational view of yet another embodiment of a bearing according to the invention.

Referring now to FIGURE 4, yet another embodiment is shown wherein the upper and lower bearing halves are each shaped to provide complementary sections corresponding to the sections of a cylinder which is cut along a diagonal plane. Thereby, each of the halves 40b and 42b respectively has a relatively deep side 60b and 62b, respectively, and a relatively shallow side 64b and 66b, respectively. Thus the interior segmental spherical surfaces 68b and 70b of the bearing halves 40b and 42b each have a portion which extends above and below the center line of the ball stud 14. These interior surfaces 68b and 70 are configured and dimensioned in complementary relation to the ball head 14 so as to maintain a proximately spaced relationship between the diagonal inner surfaces 73 and 74 of the bearing halves. Thus, although the basic construction of the sections 40b and 42b corresponds to a diagonally split cylinder as described, the bearing halves when positioned in the socket in bearing relation to the ball 14 are slightly separated but are urged toward one another by the spring 44, also as hereinabove described. Also, as above described, the maintenance of a continuous bearing contact above and below the center line of the ball head 14 assures that unseating will be eliminated, since forces which would tend to effect unseating are transferred to the straight cylindrical socket wall 26.

It is also within the scope of the invention to afford a clearance between the outer diameter of the bearing structure and the socket bore, with the inner bearing surfaces being designed to initially contact the ball with the largest area possible upon free assembly with the ball and before assembly into the socket. Correspondingly, a relatively wide variation in the fit of the bearing to the socket is feasible, since both interference and clearance fits are encompassed within the invention.

Accordingly, I have provided a ball joint which not only eliminates the unseating characteristic of previously available wedge-type and dome-type ball joints, but which also provides wear take-up so as to maintain a desired turning torque value. Further, a greased for life construction for the joint is afforded by the seal or dust jacket therefor, as well as by the construction of the bearing halves themselves when a suitable self-lubricating material is utilized such as nylon or the like.

Although I have herein set forth and described my invention with respect to certain specific principles in details thereof, it will be understood by those skilled in the art that these may be varied without departing from the spirit and scope of the invention as set forth in the hereunto appended claims.

I claim as my invention:
1. A ball joint comprising
   a socket having a wall forming a cylindrical chamber therein with an opening at one end thereof,
   a stud having a segmental spherical ball head in said chamber and a shank extending rotatably and tiltably outwardly through said opening,
   a bearing in said chamber having upper and lower axially spaced annualarly shaped axially split bearing members slidable in said chamber and seated on the ball head on opposite sides of the major diameter of the ball head taken perpendicularly to the axis of said socket chamber, the opposed spaced ends of the bearing members which face each other being spaced axially at all portions thereof,
   each of said bearing members having a segmental spherical inner surface engaging the ball head in bearing relation thereto and a cylindrical outer surface engaging said wall of said socket, along the entire length of the bearing member,
   each of said bearing members having a portion thereof extending above and below said major diameter of said ball head sufficiently to provide a mechanical interlock between the surface of the ball head and the inner spherical surface of its respective bearing member, and
   resilient means constantly biasing one of said bearing members toward the ball head and the other of said bearing members.

2. A ball joint comprising
a socket having a wall forming a cylindrical chamber therein with an opening at one end thereof,
a stud having a segmental spherical ball head in said chamber and a shank extending rotatably and tiltably outwardly through said opening,
a bearing in said chamber having identical complementary upper and lower axially spaced annularly shaped axially split bearing members slidable in said chamber and seated on the ball head on opposite sides of the major diameter of the ball head taken perpendicularly to the axis of said socket chamber, the opposed spaced ends of the bearing members which face each other being spaced axially at all portions thereof,
each of said bearing members having a segmental spherical inner surface engaging the ball head in bearing relation thereto and a cylindrical outer surface engaging said wall of said socket along the entire length of said bearing member,
each of said bearing members having a portion thereof extending above and below said major diameter of said ball head sufficiently to provide a mechanical interlock between the surface of the ball head and the inner spherical surface of its respective bearing member, and
resilient means constantly biasing one of said bearing members toward the ball head and the other of said bearing members.

3. A ball joint comprising
a socket having a wall forming a cylindrical chamber therein with an opening at one end thereof,
a stud having a segmental spherical ball head in said chamber and a shank extending rotatably and tiltably outwardly through said opening,
a bearing in said chamber having upper and lower axially spaced annularly shaped axially split bearing members slidable in said chamber and seated on the ball head on opposite sides of the major diameter of the ball head taken perpendicularly to the axis of said socket chamber, the opposed spaced ends of the bearing members which face each other being spaced axially at all portions thereof,
each of said bearing members having a segmental spherical inner surface engaging the ball head in bearing relation thereto and a cylindrical outer surface engaging said wall of said socket along the entire length of said bearing member,
each of said bearing members having a portion thereof extending above and below said major diameter of said ball head sufficiently to provide a mechanical interlock to the surface of the ball head and the inner spherical surface of its respective bearing member, and
resilient means constantly biasing one of said bearing members toward the ball head and the other of said bearing members,
said extended portions of both of said bearing members comprising a plurality of teeth forming open spaces therebetween whereby the teeth of each of said bearing members are received by the open spaces of the other of said bearing members.

4. A ball joint comprising
a socket having a wall forming a cylindrical chamber therein with an opening at one end thereof,
a stud having a segmental spherical ball head in said chamber and a shank extending rotatably and tiltably outwardly through said opening,
a bearing in said chamber having upper and lower axially spaced annularly shaped axially split bearing members slidable in said chamber and seated on the ball head on opposite sides of the major diameter of the ball head taken perpendicularly to the axis of said socket chamber, the opposed spaced ends of the bearing members which face each other being spaced axially at all portions thereof,
each of said bearing members having a segmental spherical inner surface engaging the ball head in bearing relation thereto and a cylindrical outer surface engaging said wall of said socket along the entire length of said bearing member,
each of said bearing members having a portion thereof extending above and below said major diameter of said ball head sufficiently to provide a mechanical interlock between the surface of the ball head and the inner spherical surface of its respective bearing portion, and
resilient means constantly biasing one of said bearing members toward the ball head and the other of said bearing members,
said extended portions of both of said bearing members comprising a plurality of teeth forming open spaces therebetween whereby the teeth of each of said bearing members are received by the open spaces of the other of said bearing members in proximately spaced relation.

5. A ball joint comprising
a socket having a wall forming a cylindrical chamber therein with an opening at one end thereof,
a stud having a segmental spherical ball head in said chamber and a shank extending rotatably and tiltably outwardly through said opening,
a bearing in said chamber split diagonally to the major diameter of the ball head taken perpendicularly to the axis of said socket chamber to form upper and lower axially spaced annularly shaped axially split bearing members slidable in said chamber and seated on the ball head on opposite sides of said major diameter of said ball head, the opposed spaced ends of the bearing members which face each other being spaced axially at all portions thereof,
each of said bearing members having a segmental spherical inner surface engaging the ball head in bearing relation thereto and a cylindrical outer surface engaging said socket, each of said bearing members having a portion thereof extending above and below said major diameter of said ball head sufficiently to provide a mechanical interlock between the surface of the ball head and the inner spherical surface of its respective bearing member, and resilient means constantly biasing one of said bearing members toward the ball head and the other of said bearing members.

References Cited by the Examiner
UNITED STATES PATENTS

| | | |
|---|---|---|
| 2,496,869 | 2/1950 | Flumerfelt. |
| 2,749,161 | 6/1956 | Latzen. |
| 2,900,196 | 8/1959 | Nienke. |
| 2,957,714 | 10/1960 | Langen. |
| 2,973,980 | 3/1961 | Vogt et al. |
| 3,073,634 | 1/1963 | Gottschald. |
| 3,089,718 | 5/1963 | Gottschald et al. |

OTHER REFERENCES

German printed application No. 1,014,441, August 1957.

CARL W. TOMLIN, *Primary Examiner.*

WALTER A. SCHEEL, THOMAS F. GALLAGHAN, *Examiners.*

A. V. KUNDRAT, *Assistant Examiner.*